United States Patent [19]

Midden

[11] Patent Number: 5,312,637
[45] Date of Patent: May 17, 1994

[54] ONE-CUP BREWER

[75] Inventor: William E. Midden, Springfield, Ill.

[73] Assignee: Bunn-O-Matic Corporation, Springfield, Ill.

[21] Appl. No.: 81,027

[22] Filed: Jun. 21, 1993

[51] Int. Cl.$^5$ .............................................. A47J 31/36
[52] U.S. Cl. ...................................... 426/433; 99/287; 99/289 R; 99/302 P
[58] Field of Search .................. 426/433; 99/279-283, 99/287, 289 R, 289 T, 300, 302 R, 302 P, 304, 316, 323

[56] References Cited

U.S. PATENT DOCUMENTS

| | | |
|---|---|---|
| 2,529,395 | 11/1950 | Hummel . |
| 3,288,049 | 5/1964 | Schmid et al. . |
| 3,662,675 | 5/1972 | Olland . |
| 3,683,790 | 8/1972 | Black et al. . |
| 4,110,221 | 8/1978 | Moser . |
| 4,612,850 | 9/1986 | Kanazashi et al. . |
| 4,703,686 | 11/1987 | Siegfried . |
| 4,767,632 | 8/1988 | Meier . |
| 4,784,050 | 11/1988 | Cavalli ............................ 99/289 R |
| 4,796,521 | 1/1989 | Grossi ................................. 99/287 |
| 4,993,315 | 2/1991 | Huber et al. . |
| 5,134,925 | 8/1992 | Bunn et al. . |

Primary Examiner—Robert W. Jenkins
Attorney, Agent, or Firm—Trexler, Bushnell, Giangiotgi & Blackstone, Ltd.

[57] ABSTRACT

An apparatus for beverage brewing using heated liquid to infuse a beverage brewing substance during a brewing cycle. The apparatus includes a brew chamber which is positioned for communication with a reservoir having a filter positioned between the brew chamber and the reservoir. A quantity of beverage brewing substance is placed in the brew chamber and a quantity of heated water is placed in the reservoir. A pumping device pumps the water in the reservoir to the brew chamber to infuse the beverage brewing substance and produce a brewed beverage. The brewed beverage created in the brew chamber drains through the filter between the brew chamber and the reservoir and is captured by the reservoir. The brewed beverage and any remaining heated water are recirculated through the beverage brewing substance in the brew chamber for a period of time. At a desired period in the brewing cycle, a valve connected to the reservoir is operated to open the reservoir and drain the brewed beverage therefrom. The pump device drains the recirculation path between the reservoir and the brew chamber and forces air through the spent beverage brewing substance thereby expelling moisture from the spent beverage brewing substance. A plunger is used to enclose the beverage brewing substance in the brew chamber and deposit water from the pump to infuse the brewing substance. At the end of the cycle, the brew chamber is displaced from the filter and reservoir and the plunger expels the spent beverage brewing substance.

21 Claims, 6 Drawing Sheets

ONE-CUP BREWER

BACKGROUND OF THE INVENTION

The present invention relates to beverage brewing apparatuses and more particularly to beverage brewing apparatuses which quickly and efficiently brew a desired quantity of beverage.

A variety of beverage brewing apparatuses are available which incorporate a number of beverage brewing operation in a single apparatus. An example of such a beverage brewing apparatus can be seen in U.S. Pat. No. 5,134,925 to Bunn et al. The Bunn et al. reference shows a beverage brewing apparatus which brews a desired quantity of beverage by way of an infusion type brewing process. In Bunn et al. a beverage brewing substance is placed in a brew chamber and heated water is introduced into the brew chamber to infuse the substance. A brewed beverage is drained through a reusable filter material and dispensed into an appropriate container. The Bunn et al. apparatus provides a rather quick and efficient high-quality brewed beverage with a high degree of automation and minimum human interaction. The device as shown in Bunn et al., however, uses gravity flow brewing principles to brew the desired beverage from the brewing substance.

It has been found to be desirable to further accelerate the beverage brewing process to produce a desired quantity of brewed beverage within a shorter period of time. It is also desirable to maintain the degree of automation and, especially, maintain a high quality and consistency of flavor of the brewed beverage produced by such a system. Additionally, it would be desirable to brew a beverage and dispose of the spent brewing substance in a clean and efficient manner.

While it has been stated that it would be desirable to quickly produce a brewed beverage, this is not to say that a beverage brewing system meeting these desirable conditions would utilize espresso brewing principles. Espresso brewing principles are substantially different than drip or gravity brewing principles as used in Bunn et al. Espresso principles produce a brewed beverage by infusing a quantity of brewing substance in a pressure chamber with pressurized water. For example, when brewing drip coffee, a gravity system will utilize approximately two tablespoons of ground coffee for each six ounces of water. Espresso brewing utilizes approximately two-thirds of the ground coffee (having a substantially finer particulate size) and infuses the ground coffee with pressurized water to produce approximately one to two ounces of espresso brew.

The espresso principles have been used to quickly produce a desired quantity of coffee at a desired strength for consumption either as an espresso drink or to be diluted with hot water to produce a beverage similar to a gravity or drip brewed beverage. A problem arises with the espresso techniques and automation in that it can be difficult to remove the spent coffee grounds from the brewing chamber.

The following list is provided by way of background to show a variety of beverage brewing devices.

| Patent No. | Inventor | Issue Date |
|---|---|---|
| 4,993,315 | Huber et al. | 02/19/1991 |
| 4,767,632 | Meier | 08/30/1988 |
| 4,703,686 | Siegfried | 11/03/1987 |
| 4,612,850 | Kanazashi et al. | 09/23/1986 |

-continued

| Patent No. | Inventor | Issue Date |
|---|---|---|
| 4,110,221 | Moser | 08/29/1978 |
| 3,683,790 | Black et al. | 08/15/1972 |
| 3,662,675 | Ollander | 05/16/1972 |
| 3,288,049 | Schmid et al. | 11/29/1966 |
| 2,529,395 | Humel | 11/07/1950 |

OBJECTS AND SUMMARY OF THE INVENTION

A general object of the present invention is to provide a beverage brewing apparatus which quickly and efficiently brews a desired quantity of beverage from a beverage brewing substance.

Another object of the present invention is to quickly brew a beverage from a beverage brewing substance by recirculating brewed beverage through the beverage brewing substance.

Still another object of the present invention is to provide a beverage brewing apparatus which efficiently drains and handles spent brewing substances.

Still a further object of the present invention is to provide a beverage brewing apparatus which can reliably and repeatably brew a beverage from fresh brewing substance without using highly pressurized infusion water.

Briefly, and in accordance with the foregoing, the present invention envisions an apparatus for beverage brewing which uses heated liquid to infuse a beverage brewing substance during a brewing cycle. The apparatus includes a brew chamber which is positioned for communication with a reservoir having a filter positioned between the brew chamber and the reservoir. A quantity of beverage brewing substance is placed in the brew chamber and a quantity of heated water is placed in the reservoir. A pumping device pumps the water in the reservoir to the brew chamber to infuse the beverage brewing substance and produce a brewed beverage. The brewed beverage created in the brew chamber drains through the filter between the brew chamber and the reservoir and is captured by the reservoir. The brewed beverage and any remaining heated water are recirculated through the beverage brewing substance in the brew chamber for a period of time. At a desired period in the brewing cycle, a valve connected to the reservoir is operated to open the reservoir and drain the brewed beverage therefrom. The pump device drains the recirculation path between the reservoir and the brew chamber and forces air through the spent beverage brewing substance thereby expelling moisture from the spent beverage brewing substance. A plunger is used to enclose the beverage brewing substance in the brew chamber and deposit water from the pump to infuse the brewing substance. At the end of the cycle, the brew chamber is displaced from the filter and reservoir and the plunger is driven an additional distance to expel the spent beverage brewing substance from the brew chamber. The spent beverage brewing substance expelled from the chamber is substantially drained to facilitate ease of handling and disposal.

BRIEF DESCRIPTION OF THE DRAWINGS

The organization and manner of the structure and operation of the invention, together with further objects and advantages thereof, may be understood by reference to the following description taken in connection with the accompanying drawings, wherein like reference numerals identify like elements, and in which.

DETAILED DESCRIPTION OF THE PREFERRED EMBODIMENT

While the invention may be susceptible to embodiment in different forms, there is shown in the drawings, and herein will be described in detail, an embodiment with the understanding that the present description is to be considered an exemplification of the principles of the invention and is not intended to limit the invention to that as illustrated and described herein.

Figure 1:
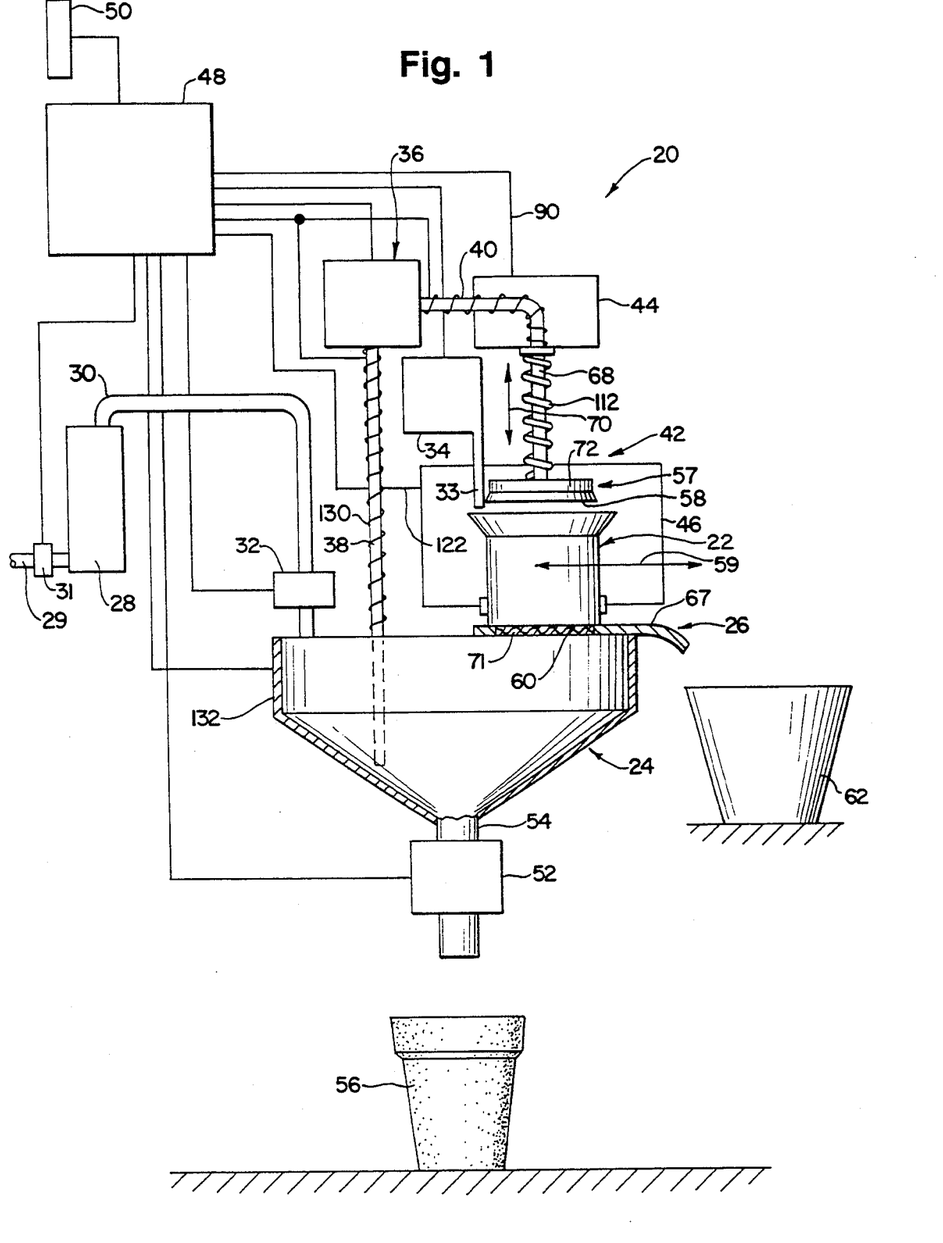
FIG. 1 is a simplified schematic view of the present invention showing the various features of the present invention in a simplified form.

As shown in the simplified schematic of FIG. 1, a beverage brewing apparatus 20 is shown and includes a brew chamber 22 positioned above a reservoir 24 having a filter 26 positioned therebetween. A hot water tank 28 is connected to the reservoir 24 by way of a feedline 30 extending between the hot water tank 28 and the reservoir 24. A control valve 32 is placed in the path of the feedline 30 to control the flow of water from the hot water tank 28. The hot water tank 28 provides brewing water for the brewing cycle. An inlet line 29 and an inlet control valve 31 are controllable to add water to the hot water tank 28 on demand.

A brewing substance delivery assembly 34 having a downwardly disposed delivery tube 33 delivers a quantity of brewing substance 35 to the brew chamber 22 for use in a brewing cycle. Means for circulating liquid or a pump device 36 communicates with both the reservoir 24 and the brew chamber 22. A reservoir line 38 extends between the pump device 36 and the reservoir 24 and a brew chamber line 40 extends between the pump device 36 and the brew chamber 22. A piston or plunger 42 is connected with the brew chamber end of the brew chamber line 40. Use of the plunger 42 will be described in further detail hereinbelow. Means for moving the plunger 44 and means for displacing the brew chamber 46 are associated with the plunger 42 and the brew chamber 22, respectively.

A control device 48 is provided to manage the sequence of events or operations carried out by the various components described hereinabove. The control device 48 is a programmable controller of known construction which is generally available to provide command signals at appropriate times based on time periods, control signals, or as sensed at other components. The control device 48 is connected to a control panel 50 which is operatable by user to control the beverage brewing apparatus 20 such as, for selecting a desired quantity or type of beverage as well as a variety of other factors including control of the various components described hereinabove.

The following is a general description of the operation of the brewing apparatus 20 n accordance with the present invention. When a user initiates a brew cycle, the control means 48 operates the brewing substance delivery assembly 34 to dispense a quantity of brewing substance 35 into the brew chamber 22. Simultaneously, the hot water tank 28 dispenses a quantity of water into the reservoir 24. The pump 36 moves the water from the reservoir 24 and deposits the water in the brew chamber 22. The brewing substance 35 in the brew chamber is infused with the heated water and a brewed beverage drains through the filter 26 and is collected in the reservoir 24. The brewed beverage and heated water are retained in the reservoir by a dispensing means or dispensing valve 52 connected to a dispensing opening 54 of the reservoir 24. As such, the brewed beverage which drains into the reservoir 24 is recirculated by the pump 36 through the brew chamber 22 for a desired period of time. Eventually, the dispensing valve 52 is open allowing the brewed beverage to drain from the reservoir 24 into a collection container 56.

It should noted, that during the infusion process the heated water is fed through a spray head assembly 57 of the plunger 42 having a formaminous operating face 58. The plunger 42 is operated by the plunger moving means 44 to position the plunger 42 to enclose the beverage brewing substance 35 in the brew chamber 22. At the end of the brewing cycle the plunger 42 is moved downwardly to slightly compress the beverage brewing substance 35 thereby "squeezing" brewed beverage from the spent brewing substance to further drain the brewing substance. The brew chamber displacing means 46 is operated to move (as indicated by arrow 59) the brew chamber 22 away from the filter 26 and reservoir 24 exposing an open mouth 60 of the brew chamber 22. When the brew chamber 22 is displaced by the displacing means 46, the plunger 42 is driven an additional distance to expel the spent brewing substance from the brew chamber 22 into a collection bin 62.

After the brewed beverage is drained from the reservoir 24 and the spent brewing substance is expelled from the brew chamber 22, the brew chamber 22 is moved back into the position over the filter 26 in communication with the reservoir 24. Additionally, the dispensing valve 52 is closed and the plunger 42 is moved upwardly thereby opening the hollow brew chamber 22 to prepare to receive the next quantity of brewing substance 35 upon initiation of a brewing cycle.

Figure 2:
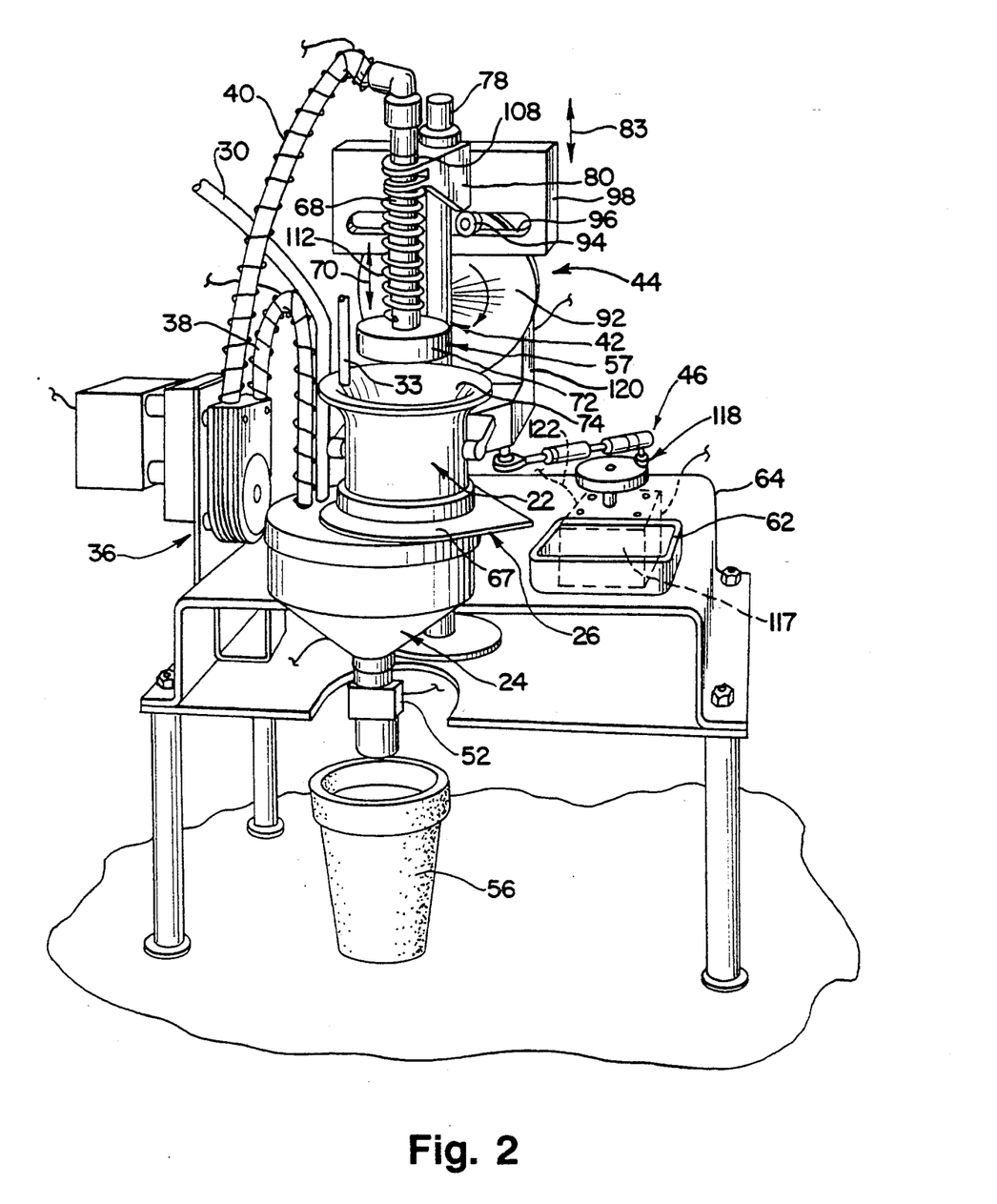
FIG. 2 provides a view of a more detailed structural arrangement of the apparatus of the present invention as shown in a simplified form in FIG. 1.
Figure 3:
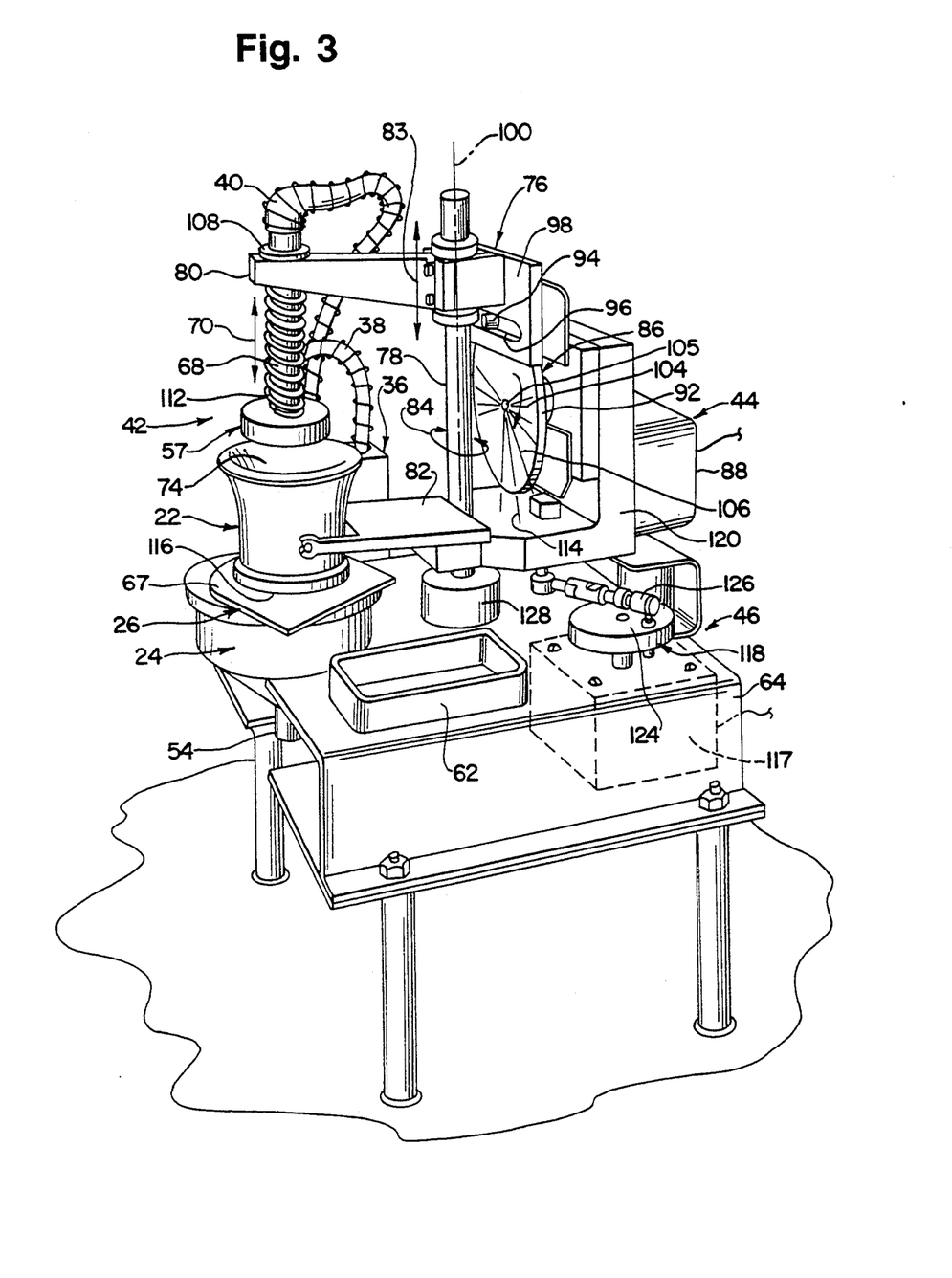
FIG. 3 provides a right side perspective view of the apparatus as shown in FIG. 2.
Figure 4:
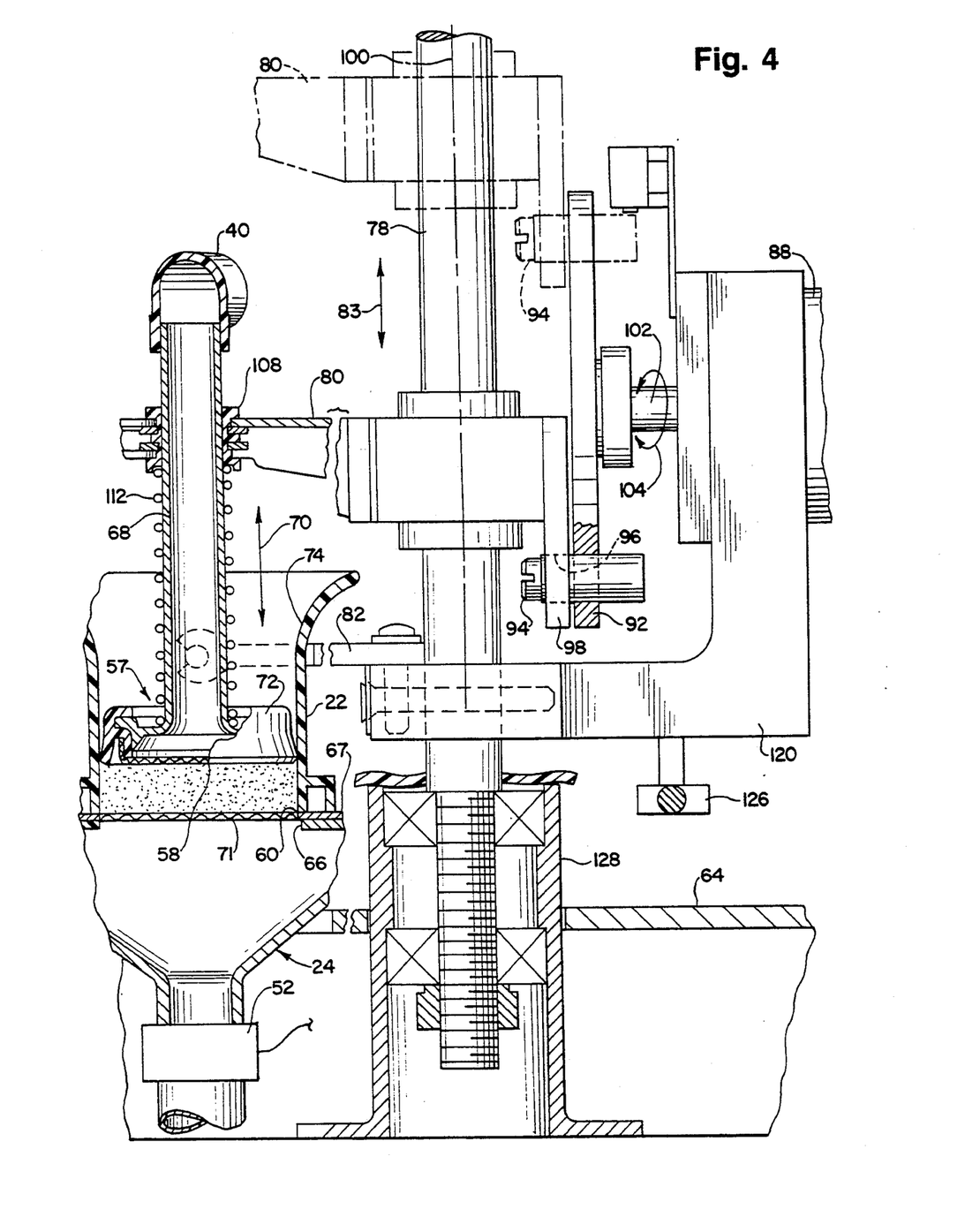
FIG. 4 provides an enlarged partial fragmentary, cross-sectional, right side elevational view of the apparatus as shown in perspective in FIGS. 2 and 3.

Having described the general operation of the present invention by way of the simplified schematic in FIG. 1, we now turn to the more detailed structural illustration as shown in FIGS. 2-4 and the more detailed operation illustrations as shown in FIGS. 5-8.

As shown in FIGS. 2-4, the apparatus 20 includes a base 64. The reservoir 24 is positioned on the base 64 so that the dispensing opening 54 is positioned above the collection container 56. As better shown in FIG. 4, the reservoir 24 has an opening 66 which communicates with the mouth 60 of the brew chamber 22. The filter 26 includes a filter plate 67 and filter material 72 attached to the filter plate 67. The filter 26 is attached to the reservoir 24. When the brew chamber displacing means 46 moves the brew chamber 22, the brew chamber 22 moves across the plate 67 to deposit spent brewing substance into the collection bin 62. As shown in FIG. 3, the plate 67 helps to prevent dropping any drained brewing substance on the base 64.

With reference to FIGS. 2 and 5-8, the pump device 36 is shown connected to the reservoir 24 and the plunger 42. As shown in FIG. 2, the pump device 36 is a peristaltic pump of known construction. The pump 36 is capable of creating pressure in the brew chamber line 40 thereby providing a degree of pressurized infusion of the brewing substance 35 when the pressurized heated water is emitted from the spray head assembly 57 of the plunger 42. Water enters the reservoir 24 from the feedline 30 and is sucked out of the reservoir 24 through the reservoir line 38 as a result of the pumping action of the pump 36. The brew chamber line 40 attaches to a generally rigid feed tube 68 of the plunger 42. The brew chamber line 40 is sufficient length to provide for vertical movement (as indicated by arrow 70) of the plunger 42. A head 72 of the spray head assembly 57 is sized and dimensioned to intimately fit in an inside surface 74 of the brew chamber 22. As such, when the pump 36 creates a moderate amount of pressure in the brew chamber line 40, the intimate fit between the head 72 and the inside 74 of the brew chamber 22 prevents top side leakage during the brewing process.

The plunger 42 and brew chamber 22 are carried on a transport assembly 76. The transport assembly 76 includes post 78, a plunger arm 80, slidably associated with the post 78, and a chamber arm 82 which positions the chamber 22 for cooperative mating with the plunger 42. Shiftable displacement (as indicated by arrow 83) of the plunger arm 80 along the post 78 is achieved by the plunger moving means 44. Rotatable movement (as indicated by rotary arrow 84) is achieved by the brew chamber displacing means 46.

The plunger moving means 44 includes a cam assembly 86 which moves the arm 80 up and down along the post 78. An electric motor 88 drives the cam assembly 86. The control device 48 is coupled to the motor 88 by way of control line 90 to controllably operate the plunger moving means 44 at an appropriate point in the brewing sequence. The cam assembly 86 includes a cam disc 92 having a protrusion 94 attached thereto and engaging a slot 96 formed through a mounting plate 98. The slot 96 is elongated perpendicular to an axis 100 of the post 78. As the cam disk 92, attached to a shaft 102 of the motor 88, is rotated, the rotary motion of the cam disk 92 is translated into vertical motion by the engagement of the protrusion 94 in the slot 96. As such, as the cam disk 92 is rotated in a clockwise direction (as indicated by arrow 104) the protrusion 94, spaced radially away from a center 105 of the cam disk 92 follows the clockwise motion 102 by moving in the elongated slot 96. As the protrusion 94 moves in the slot 96, the mounting plate 98 is driven downwardly. Therefore, the arm 80 and attached plunger 42 move downwardly with the mounting plate 98.

During the brewing cycle, the plunger and arm 40, 80 move downwardly to a brewing position (as indicated by line 106) on the cam disk 92. In the brewing position, the water pumped through the brew chamber line 40 and feed tube 68 create a slight back pressure on the feed tube 68 since the rate of discharge of brewed beverage through the filter 26 is not equal to the rate of inflow created by the pump 36. The feed tube 68 is slidably mounted in a bushing 108 attached to the arm 80 thereby allowing vertical movement 70 of the feed tube 68. A spring 112 is retained between the head 72 and the arm 80 to provide a spring force on the head 72 while the water is emitted therefrom. The spring force helps to maintain a desired pressure in the line 40 during the brewing process. Towards the end of the brewing process, the dispensing valve 52 is open and the brewed beverage is drained from the reservoir 24. When this occurs, the pressure built up in the lines 40, 38 and the reservoir 24 dissipates and the spring force tends to drive a portion of fluid from the spent brewing substance. At a desired time, the plunger moving means 44 further drives the plunger 42 downwardly (as indicated by arrows 113 in FIG. 7) in the brew chamber 22 to a position as indicated by line 114 on the cam disk 92. Further driving of the plunger 42 tends to squeeze additional liquid from the beverage brewing substance to drain the beverage brewing substance for easier handling.

At this point in the brewing process, the brew chamber displacing means 46 moves 59 the brew chamber 22 and arm 80 about the central axis 100 of the post 78 to displace the brew chamber 22 from the filter plate 67. Upon displacing the brew chamber 22 from the filter plate 67, a rim 115 along a bottom edge of the brew chamber 22 slides and dislodges spent beverage brewing substance from the filter material 71. Since the spent beverage brewing substance 35 has a degree of moisture in it, it retains a somewhat cake-like form in the brewing chamber 22. Next, the plunger 42 is driven (as indicated by arrow 116) an additional distance, corresponding to the bottom most movement of the protrusion 94, to expel the cake from the brew chamber 22 and deposit it in the collection bin 62. Upon expelling the spent coffee substance cake into the collection bin 62, the cam disk 92 continues to rotate in the clockwise direction until the protrusion 94 is returned to the upper most position whereupon the plunger 42 is fully disengaged from the brew chamber 22. The brew chamber displacing means 46 simultaneously rotates the brew chamber and arm 22, 80 about the central axis 100 of the post 78 to position the brew chamber 22 in position over the reservoir 24.

The brew chamber displacing means 46 includes an electric motor 117 attached to and positioned below the base 64 and an eccentric mechanism 118 attached to the motor 117 and a frame member 120. As shown in FIG. 1, the brew chamber displacing means 46 is controlled by the programmable controller 48 over line 122. Operation of the eccentric mechanism 118 by the motor 117 rotates a disk 124 and moves an eccentric arm 126 attached to the disk 124 and the frame member 120. The arm 126 is attached to the disk 124 at a radially spaced distance from the center of the disk 124. The arm 126 attaches to the frame member 120 to move the frame member 120 in response to a signal from the controller 48. As such, the movement of the eccentric mechanism 118 is synchronized by way of the programmable controller 48 with the movement and timing of the system while brewing a beverage. When the frame member 120 is moved, the frame 120 pivots or rotates (arrow 84) about the post 78 attached to a pivotable foundation 128 on the base 64.

As an additional matter, heating means 127 are provided on the reservoir line 38, the brew chamber line 40 and the reservoir 24. The heating means 127 include a heating device or coiled wrapped heater 130 wrapped around the reservoir line 38 and the brew chamber line 40. Additionally, a heating blanket 132 is wrapped around the reservoir 24. The heating devices 130, 132 are energized to maintain the temperature of the heated water and brewed beverage in the reservoir 24 and circulated through the reservoir line 38 and brew chamber line 40.

When water is introduced to the reservoir 24 through the feed line 30, the heating blanket 132 maintains the water in the reservoir 24 at a desired temperature. As the pump 36 pumps the water from the reservoir 24 through the reservoir line 38, the heating coil wrap 130 around the reservoir line 38 prevents heat loss to the environment. As the water moves through the pump 36 and into the brew chamber line 40, the heating wrap 130 acts to maintain the water at a desired temperature. As a brewed beverage filters into the reservoir 24 from the brew chamber 22 and is moved through the pump 36 the heating devices 130, 132 maintain the temperature of the brewed beverage. As such, when the dispensing valve 52 is operated to release or dispense beverage from the reservoir 24, the temperature of the beverage will be at the desired temperature instead of at a reduced temperature due to environmental heat loss.

Figure 5:
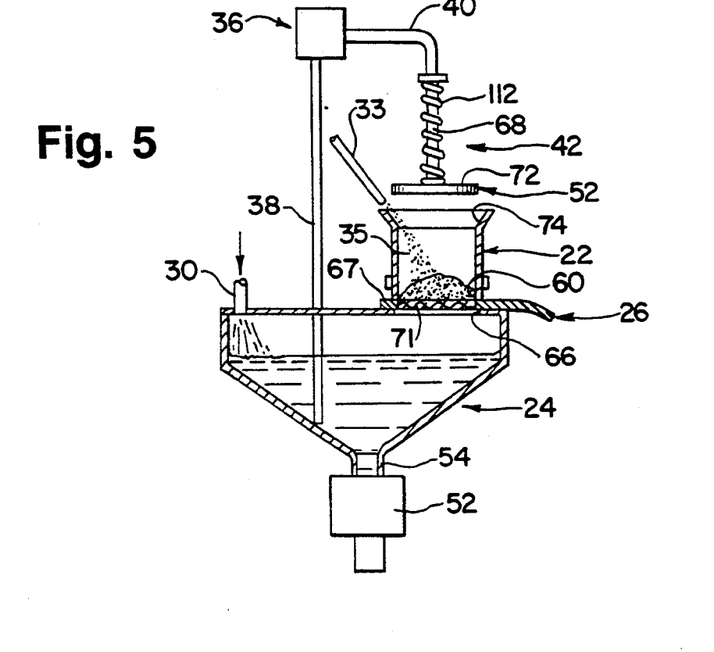
FIG. 5 is a simplified operating illustration of the present invention showing depositing of a brewing substance into a brew chamber and introduction of water into a reservoir.

We now turn to FIGS. 5-8 in order to more fully describe the method and function of brewing coffee using the present invention. FIGS. 5-8 show a rather simplified version of the present invention and draw upon some of the mechanical and functional details as set forth hereinabove. As shown in FIG. 5, the brewing process is initiated by depositing a quantity of brewing substance 35 into the brew chamber 22 and introducing water from the feedline 30 into the reservoir 24. At this stage of the process, the dispensing valve 52 is operated to prevent flow through the dispensing opening 54.

Figure 6:
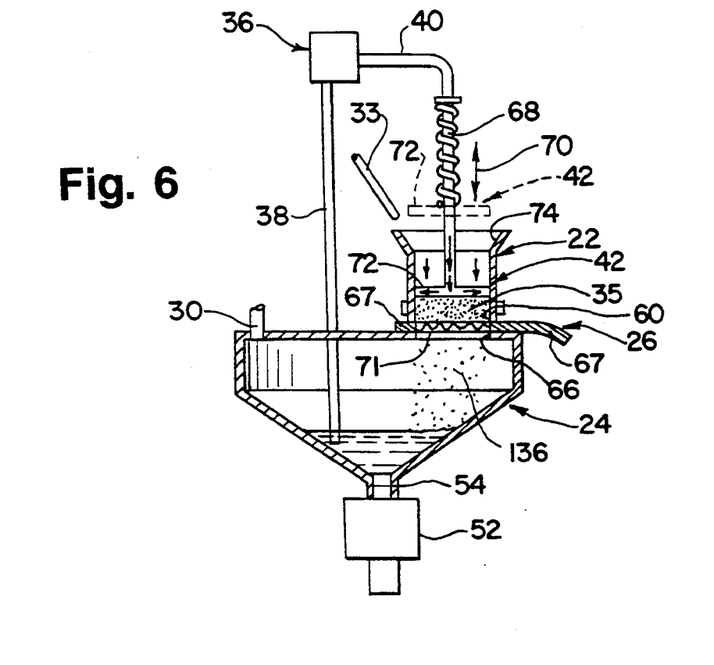
FIG. 6 shows the simplified illustration as in FIG. 5 in which a pump devices moves water from the reservoir through a circulation path and expels the water through a plunger which is operated to enclose the beverage brewing substance in the brew chamber.

Once the brewing substance 35 is deposited into the brew chamber 22, the plunger 42 is driven downwardly 70 to enclose the brewing substance 35 in the brewing chamber 22 between the head 72 of the plunger 42 and the filter assembly 26. Water from the reservoir 24 is pumped through the lines 38, 40 by the pump 36 and is emitted through the head 72 to infuse the brewing substance 35 enclosed in the brew chamber 22. A beverage 136 drains through the filter material 71 of the filter assembly 26 and into the reservoir 24. Once the beverage 136 collects in the reservoir, it tends to mix with any remaining heated water and is pumped back through the pump 36 and lines 38, 40 to the head 72. The brewed beverage 136 circulates from the reservoir 24 through the brewing substance 35 for a desired time based on factors including, but not limited to, quantity of beverage brewing substance, desired quantity of beverage, strength of brew, type of coffee, etc.

Figure 7:
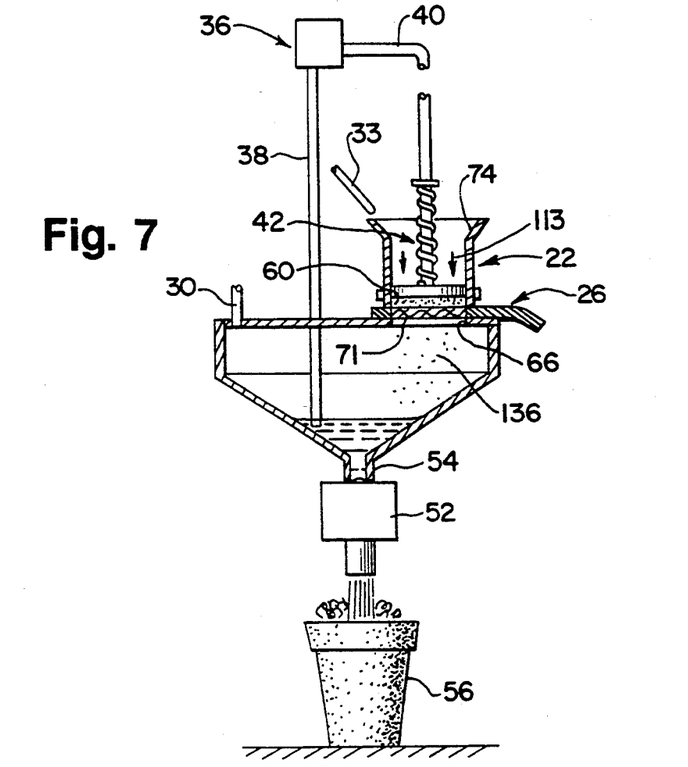
FIG. 7 shows the simplified illustration as in FIGS. 5 and 6 in which a control valve associated with the reservoir is operated to allow brewed beverage accumulated in the reservoir to drain therefrom into a container.

As shown in FIG. 7, the dispensing valve 52 is operated to release the contents of the reservoir 24 into the container 56. The brewed beverage 136 drains into the container 56 and thereby decreases the liquid level in the reservoir 24. As the liquid level drops below the intake point of the reservoir line 38, the pump 36 begins to drive air from the reservoir 24 through the brew chamber line 40. Air is driven through the head 72 of the plunger 42 driving moisture from the spent brewing substance 35 enclosed in the brew chamber 22. The additional moisture driven out by the air pumped through the plunger 42 drains into the reservoir 24 and into the cup 56. Next, the plunger is moved downwardly 113 slightly as discussed hereinabove, to squeeze an additional amount of moisture from the spent brewing substance 35. The additional moisture also drains into the reservoir and subsequently into the cup 56.

Figure 8:
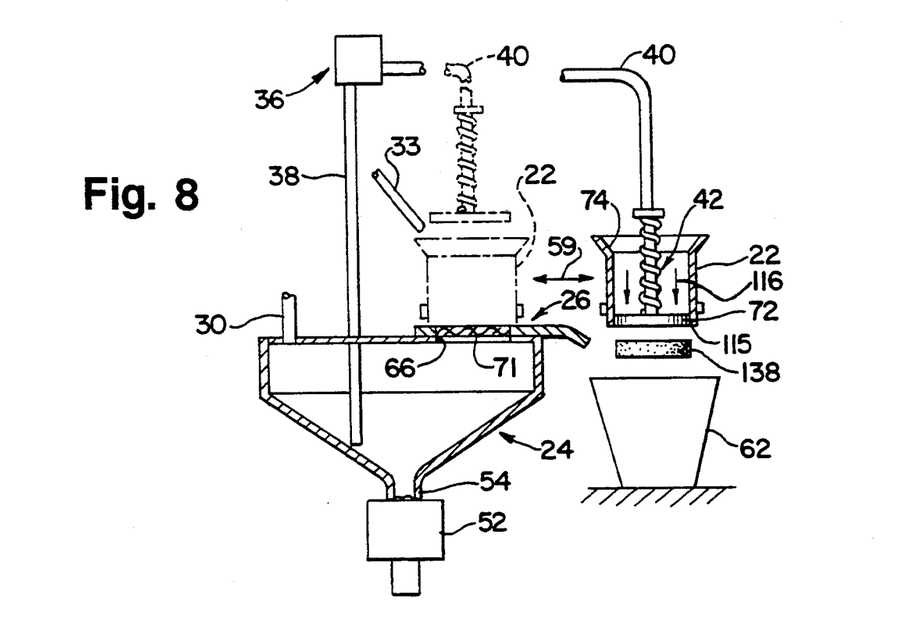
FIG. 8 is a simplified illustration as shown in FIGS. 5-7 in which the brew chamber is displaced from the filter and the plunger is moved to eject spent beverage brewing substance from the brew chamber into a collection bin.

After the spent brewing substance 35 is squeezed, the brew chamber 22 is displaced 59 from the filter assembly 26 to disengage the mouth 60 of the brew chamber 22 from the filter assembly 26. When the brew chamber 22 is displaced 59 to a desired position, the plunger 44 is driven 116 an additional distance downwardly through the brew chamber 22 to expel a cake-like body 138 of spent brewing substance into the collection bin 62. After the cake-like body 138 is expelled from the brew chamber 22 (as shown in FIG. 8), the brew chamber 22 returns 59 to an engaged position with the filter assembly 26.

After the brew chamber 22 disengages from the filter assembly 26, the dispensing valve 52 is controlled to close thereby readying the reservoir 24 for the next brewing operation. As the brew chamber 22 is reengaged with the filter assembly 26, the plunger 42 is moved upwardly and out of engagement with the brew chamber 22 thereby readying the brew chamber 22 to receive another quantity of brewing substance from the brewing substance delivery assembly 34.

In use, the brewing apparatus 20 of the present invention quickly and efficiently brews a desired quantity of beverage employing a structure and process which minimizes brewing time, and maximizes brewing efficiency and quality. The process employs heated water and recirculation of brewed beverage under the influence of a degree of pressure and increased flow rate. During the brewing process, heated water is pumped through an enclosed beverage brewing substance 35 under an increased flow rate and a degree of pressure. The present invention employs a hybridized brewing process which incorporates principles similar to both drip and espresso brewing methods. The pressure employed in the present invention, while elevated compared to drip brewing, does not equal the pressure employed in espresso brewing. The brewed beverage produced during the infusion step is recirculated in order to maximize the extraction of the coffee essence from the brewing substance while maintaining a high degree of quality in the final brewed beverage.

A brewing substance is deposited into the brew chamber 22 and a quantity of water is dispensed into the reservoir 24. The reservoir water is pumped from the reservoir 24 and into the brew chamber 22 through the spray head assembly 57 of the plunger 42 to infuse the brewing substance. A brewed beverage 136 drains through the filter material 71 of the filter assembly 26 and into the reservoir 24. The brewed beverage 136 is pumped through the pump 36 and back through the spray head assembly 57 of the plunger 42. After a desired condition occurs, the dispensing valve 52 opens to allow the brewed beverage 136 to drain from the reservoir 24. The pump 36 continues to pump from the reservoir 24 until the level of fluid in the reservoir 24 drops below the intake level of the reservoir line 38.

The pump 36 pumps air through the head portion 72 to facilitate and drive out a portion of moisture in the beverage brewing substance. The moisture in the form of brewed beverage drains into the reservoir 24 and into a container 56. An additional squeeze is given to the brewing substance by the plunger 42 to force out an additional amount of moisture retained in the spent brewing substance. The ability to drive out and squeeze out additional portions of moisture from the spent brewing substance results in a spent brewing substance which is drained and more manageable. Additionally, by draining the additional portion of moisture driven out at the end of the brewing process into the container, less waste liquid must be handled thereby improving the efficiency and ease of use of the apparatus 20. The brew chamber 22 is disengaged from the filter assembly 26 by the brew chamber displacing means 46. The plunger 42 is driven an additional distance to expel the spent brewing substance, in a loose, cake-like form 138, from the brew chamber 22 into a collection bin 62. The displacing means 46 returns the brew chamber 22 to an engaged position with the filter assembly 26 and the plunger moving means 44 upwardly displaces the plunger 42 from the brew chamber 22.

While a preferred embodiment of the present invention is shown and described, it is envisioned that those skilled in the art may devise various modifications of the present invention without departing from the spirit and scope of the appended claims. The invention is not intended to be limited by the foregoing disclosure.

The Invention claimed Is:

1. An apparatus for beverage brewing of the type which retains a brewing substance and infuses said substance with liquid during a brewing cycle to produce a brewed beverage, said apparatus comprising:
   a brew chamber having a mouth;
   a reservoir operatively associated with said brew chamber, said reservoir having an opening selectively communicating with said mouth for receiving a brewed beverage from said brew chamber;
   a filter positioned between said brew chamber and said reservoir, said filter having a foraminous surface for retaining said brewing substance in said brew chamber and allowing a brewed beverage to pass therethrough;
   means for displacing said brew chamber relative to said reservoir, said displacing means selectively moving said mouth into and out of communication with said opening;
   a plunger operatively associated with said brew chamber, said plunger being controllably moveable through said brew chamber for confining said brewing substance during a brewing cycle, forcing liquid from said brewing substance at the end of a brewing cycle, and expelling the drained brewing substance from said brew chamber after moving said mouth of said brew chamber out of communication said reservoir; and
   means for circulating liquid from said reservoir to said brew chamber.

2. An apparatus for beverage brewing as recited in claim 1, said circulating means further comprising:
   a pump and flow lines connecting said reservoir to said pump and said pump to said brew chamber for circulating liquid from said reservoir to said brew chamber.

3. An apparatus for beverage brewing as recited in claim 2, further comprising:
   a bore extending through said plunger defining a flow path communicating with said flow line from said pump for delivering liquid to said brewing substance confined in said chamber by said plunger.

4. An apparatus for beverage brewing, said apparatus receiving a brewing substance and infusing said brewing substance with liquid to produce a brewed beverage, said apparatus comprising:
   a reservoir for receiving and retaining liquid, said reservoir having a brew receiving opening and a dispensing opening formed therethrough;
   dispensing means for controlling dispensing of liquid from said reservoir being operatively associated with said dispensing opening;
   a brew chamber for receiving and retaining said brewing substance during a brewing cycle, a mouth of said brew chamber controllably communicating with said brew receiving opening of said reservoir;
   means for displacing said brew chamber relative to said reservoir;
   a filter for retaining said brewing substance in said brew chamber and allowing liquid to pass therethrough, said filter being positioned between said brew chamber and said reservoir;
   a plunger being operatively associated with said brew chamber, said plunger being controllably displaceable relative to said brew chamber;
   moving means for controllably displacing said plunger through said brew chamber; and
   means for circulating liquid from said reservoir to said brew chamber.

5. An apparatus for beverage brewing as recited in claim 4, wherein said means for displacing said brew chamber vertically displaces said brew chamber relative to said reservoir.

6. An apparatus for beverage brewing as recited in claim 4, wherein said means for displacing said brew chamber moves said brew chamber in a horizontal plane relative to said reservoir for engaging and disengaging said mouth and said receiving opening.

7. An apparatus for beverage brewing as recited in claim 4, further comprising:
   said filter covering said brew receiving opening in said reservoir;
   said means for moving said brew chamber rotating said brew chamber in a horizontal plane relative to said reservoir for placing said mouth of said brew chamber into and out of communication with said brew receiving opening in said reservoir; and
   said plunger moving downwardly through said brew chamber when said brew chamber is displaced from said reservoir for expelling said drained brewing substance from said brew chamber through said mouth.

8. An apparatus for beverage brewing as recited in claim 4, further comprising:
   heating means being operatively associated with said circulating means for heating said liquid circulated from said reservoir to said brew chamber by said circulating means.

9. An apparatus for beverage brewing as recited in claim 4, further comprising:
   heating means being operatively associated with said reservoir for heating said liquid retained in said reservoir prior to dispensing from said reservoir.

10. An apparatus for beverage brewing, said apparatus receiving a brewing substance and infusing said brewing substance with liquid to produce a brewed beverage, said apparatus comprising:

a reservoir for receiving and retaining liquid, said reservoir having a brew receiving opening and a dispensing opening formed therethrough;

a controllable dispensing valve communicating with said dispensing opening for selectively dispensing liquid from said reservoir;

a hollow brew chamber positioned on top of said reservoir, a mouth of said brew chamber communicating with said brew receiving opening of said reservoir;

means for moving said brew chamber relative to said reservoir;

a filter positioned between said brew chamber and said reservoir, said filter having a foraminous surface for retaining said brewing substance in said brew chamber and allowing liquid to pass therethrough;

a plunger being controllably displaceably disposed in said brew chamber; and a pump communicating with said reservoir said brew chamber for circulating liquid from said reservoir to said brew chamber.

11. A method of brewing a beverage comprising the following steps:

depositing a brewing substance into a brew chamber;

placing a plunger on top of said brewing substance disposed in said brew chamber for enclosing said brewing substance;

introducing liquid into a reservoir;

circulating said liquid from said reservoir to said brew chamber;

infusing said brewing substance with said liquid circulated from said reservoir;

filtering a brewed beverage from said brew chamber;

collecting said brewed beverage in said reservoir from said brew chamber;

circulating said brewed beverage from said reservoir to said brew chamber;

draining said brewed beverage from said reservoir into a container.

12. A method of brewing a beverage as recited in claim 11, further comprising:

circulating said liquid and brewed beverage from said reservoir through said brew chamber under pressure;

emitting said liquid and brewed beverage from said plunger when circulating from said reservoir to said brew chamber.

13. A method of brewing a beverage as recited in claim 12, further comprising:

displacing said brew chamber from said reservoir;

applying a force to said plunger to expel the drained brewing substance from said brew chamber.

14. A method of brewing a beverage as recited in claim 11, further comprising:

draining a brewed beverage from said reservoir;

applying a force to said plunger to compress said brewing substance to force moisture therefrom while draining said brewed beverage from said reservoir.

15. A method of brewing a beverage comprising the following steps:

depositing a brewing substance into a brew chamber;

placing a plunger on top of said brewing substance disposed in said brew chamber for enclosing said brewing substance;

introducing liquid into a reservoir;

circulating said liquid from said reservoir to said brew chamber;

infusing said brewing substance enclosed in said brew chamber with said liquid circulated from said reservoir;

filtering a brewed beverage from said brew chamber;

collecting said brewed beverage in said reservoir;

circulating said brewed beverage from said reservoir to said brew chamber;

draining said brewed beverage from said reservoir;

applying pressure to said brewing substance in said brew chamber to force moisture therefrom while draining said brewed beverage from said reservoir.

16. A method of brewing a beverage as recited in claim 15, further comprising:

circulating said liquid and brewed beverage from said reservoir through said brew camber under pressure.

17. A method of brewing a beverage as recited in claim 16, further comprising:

circulating said liquid and brewed beverage from said reservoir through said brew chamber under pressure;

emitting said liquid and brewed beverage from said plunger when circulating from said reservoir to said brew chamber.

18. A method of brewing a beverage as recited in claim 17, further comprising:

draining a brewed beverage from said reservoir;

applying a force to said plunger to compress said brewing substance to force moisture therefrom while draining said brewed beverage from said reservoir.

19. A method of brewing a beverage as recited in claim 15, further comprising:

displacing said brew chamber from said reservoir;

applying a force to said plunger to expel the drained brewing substance from said brew chamber.

20. A method of brewing a beverage as recited in claim 15, further comprising:

circulating said liquid and brewed beverage from said reservoir through said brew chamber under pressure;

emitting said liquid and brewed beverage from said plunger when circulating from said reservoir to said brew chamber.

21. A method of brewing a beverage as recited in claim 20, further comprising:

displacing said brew chamber from said reservoir;

applying a force to said plunger to expel the drained brewing substance from said brew chamber.

\* \* \* \* \*